United States Patent
Thomas

[11] 3,784,903
[45] Jan. 8, 1974

[54] LEAKAGE DETECTOR FOR DETERMINING POSSIBLE SHOCK HAZARDS TO HUMANS

[75] Inventor: Lucius Ponder Thomas, Indianapolis, Ind.

[73] Assignee: RCA Corporation, New York, N.Y.

[22] Filed: Nov. 10, 1970

[21] Appl. No.: 88,362

[52] U.S. Cl. .................................. 324/51, 324/133
[51] Int. Cl. ....................... G01r 31/02, G01r 19/16
[58] Field of Search ...................... 324/51, 133, 119, 324/110, 127, 72.5

[56] References Cited
UNITED STATES PATENTS

| | | | |
|---|---|---|---|
| 3,510,766 | 5/1970 | Russell et al. | 324/72.5 |
| 2,806,993 | 9/1957 | Matousek | 324/51 |
| 3,205,436 | 9/1965 | Donahue | 324/51 |
| 3,263,164 | 7/1966 | Solgere | 324/51 |
| 3,368,146 | 2/1968 | Regan et al. | 324/51 |
| 3,376,502 | 4/1968 | Rink | 324/51 |
| 3,066,284 | 11/1962 | McKinley et al. | 324/51 X |
| 3,345,562 | 10/1967 | Rockwell | 324/119 |
| 3,356,939 | 12/1967 | Stevenson | 324/127 X |
| 3,426,274 | 2/1969 | Wise | 324/119 X |
| 3,281,689 | 10/1966 | Schneider et al. | 324/119 X |
| 3,141,128 | 7/1964 | Behr | 324/51 |

FOREIGN PATENTS OR APPLICATIONS

| | | | |
|---|---|---|---|
| 878,802 | 2/1943 | France | 324/119 |

*Primary Examiner* — Gerard R. Strecker
*Attorney* — Eugene M. Whitacre

[57] ABSTRACT

A full-wave rectifier bridge circuit is coupled to a current reading meter by a resistor approximating the body load resistance of a human being. The meter provides an "up scale" indication for electrical sources supplying alternating power or direct current powers of either polarity, and is useful in performing leakage current tests on electrical appliances.

4 Claims, 1 Drawing Figure

PATENTED JAN 8 1974
3,784,903
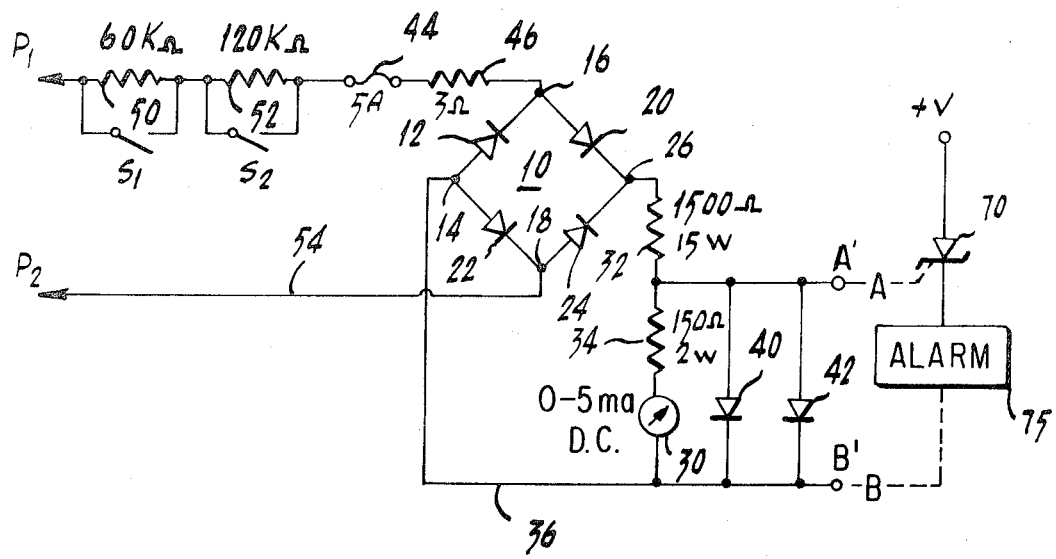
INVENTOR:
LUCIUS P. THOMAS
BY
Charles Brotsky
ATTORNEY

LEAKAGE DETECTOR FOR DETERMINING POSSIBLE SHOCK HAZARDS TO HUMANS

BACKGROUND OF THE INVENTION

1. Field of the Invention

The present invention relates to leakage current test devices for electrical appliances and, in particular, to such devices as are useful in determining whether a hazard exists in a serviced instrument to be returned to a customer.

2. Description of the Prior Art

It is generally accepted that 5 milliamperes of current passing through the body of a human being may be hazardous. Currents of three to 4 milliamperes is also accepted to be sufficient to cause serious injury, even in those cases where the injury results not from the shock itself, but from the effects of reflex action in pulling back from the initiating electrical hazard. For this reason, an electrical service technician generally performs leakage tests in an appliance he has repaired before returning it to the customer. The Underwriters Laboratory has set the acceptable limit of leakage current to 2 milliamperes, and it is this leakage current which the technician seeks to find.

One arrangement for measuring leakage current utilizes a 1,500 ohm resistor serially connected between an exposed metal cabinet part and a known earth ground. The AC line cord is plugged directly into a 120V AC outlet, and the potential across the resistor is measured with an AC voltmeter. The resistor connection is then moved to each exposed metal part (e.g. handle bracket, screwheads, overlays, control shafts, etc.), and the potential across the resistor is again measured at each new connection. The plug in the AC outlet is then reversed, and each measurement repeated. If any indication of a potential shock hazard is found, appropriate repairs are made before the instrument is returned to its owner. Such shock hazard potential is indicated when the meter reads a potential of the order of 3 volts, corresponding to a leakage current of 2 milliamperes. It will be apparent that accurate measurements can be had by switching the voltmeter to read on one of its low voltage scales.

However, in present television receiver design, the metal chassis is often itself operated at the potential of the 120V AC power line. Moving the resistor connection to the chassis or to some element short-circuited to it could thus burn out the voltmeter on its low voltage scale. Rather than risk this damage, many technicians have been understood to forego these tests when checking the operation of equipments which they have repaired.

SUMMARY OF THE INVENTION

As will become clear hereinafter, the electrical leakage detector of the present invention provides a relatively inexpensive means of testing for leakage currents. A DC milliammeter is employed, in a circuit arrangement which enables measurements to be made both for alternating current and direct current electrical powers and which enables "up scale" readings to be provided without the need for switching meter polarities. As will be described below, the milliammeter is coupled by a resistor and full-wave rectifier bridge between the terminal of the electrical power source being tested and earth ground, with the resistor being selected of a value to approximate the body load resistance of a human being. The milliammeter is seleced to measure up to 5 milliamperes—to provide indications of leakage current from a safe towards a lethal value—, and is further shunted by a diode protection network arranged to bypass the meter for those leakage currents beyond its range which might otherwise cause meter burn out. The rectifier bridge will be seen to be constructed so as to provide current flows in the same direction through the milliammeter for electrical power inputs of positive and negative polarities.

BRIEF DESCRIPTION OF THE DRAWING

These features will be apparent from a consideration of the following description in which the single FIGURE of the drawings shows a preferred embodiment of an electrical leakage detector in accordance with the present invention.

In the drawing, the full-wave rectifier bridge circuit is shown by the reference numeral 10 while the DC milliammeter is shown by the reference numeral 30. One rectifier 12 of the bridge 10 has its anode connected to an intermediate bridge terminal 14 and its cathode connected to an input bridge terminal 16 which, in turn, is connected to the anode of a second rectifier 20. Also connected to the terminal 14 is the anode of a third rectifier 22, the cathode of which is connected to a reference terminal 18 and to which is coupled the anode of a fourth rectifier 24. Both the cathodes of the rectifiers 20 and 24 are connected to a further output terminal 26, to which one end of the meter 30 is coupled by resistors 32 and 34. As indicated, the other end of the meter 30 is connected by a lead 36 to the terminal 14 of the bridge circuit 10.

The first resistor 32 coupling the meter 30 to the bridge circuit 10 is selected of a resistance value approximating the body load resistance of a human being so that the current indication of the meter 30 simulates the leakage test according to Underwriters Laboratory specifications. The second resistor 34, on the other hand, is selected of a resistance value to cooperate with a diode protection network to limit the current flow through the milliammeter. Such diode protection network includes a pair of semiconductor diodes 40, 42, each having its anode connected to the junction between resistors 32 and 34 and its cathode connected to the terminal of meter 30 which is connected to the intermediate bridge terminal 14.

Further protection for the electrical leakage tester is provided by a fuse 44 and a serially coupled current limiting resistor 46 to protect the four rectifiers of the bridge 10. As indicated, the end of the fuse 44 remote from the bridge circuit 10 is coupled to a test probe $P_1$ by means of a pair of calibrating resistors 50, 52, each of which is normally short circuited by the switches $S_1$, $S_2$, respectively. A second test probe $P_2$ is shown connected to the terminal 18 of rectifier bridge 10 by a lead 54, and the resistor 46 couples to the bridge at the terminal 16. For the case where the potential at test probe $P_1$ is positive with respect to the potential at test probe $P_2$, a conductive path is established between bridge points 16 and 18 by rectifier 20, resistors 32 and 34, meter 30, and rectifier 22. For the case where the potential at test probe $P_2$ is positive with respect to the potential at test probe $P_1$, the conductive path between bridge points 16 and 18 is completed through rectifier 24, resistors 32 and 34, meter 30 and rectifier 12. In each instance, it will be seen that the direction of current flow is from terminal point 26 through the resistors 32 and 34 and the meter 30 to the terminal point 14 so that the milliammeter 30 will provide "up scale" readings for both polarities, thereby making it unnecessary for the service technician to switch the polarity of his test instrument in accordance with the type of potentials applied.

In testing the leakage current detector including the milliammeter 30 and the assumed earth ground (water pipe, conduit, etc.), the following procedure may be carried out. First, the test probe $P_1$ is connected to one side of an AC outlet while the test probe $P_2$ is connected to the other side of the outlet. Switches $S_1$ and $S_2$ are initially closed to short circuit the resistors 50, 52. With the values shown in the drawing, and with the bridge rectifiers selected of a 1N1763A type classification, milliammeter 30 will read approximately 4.5 milliamperes. This follows because resistor 34 establishes a potential at its junction with resistor 32 sufficient to forward bias the diodes 40 and 42 at this current level, so as to limit the current flow through milliammeter 30 and to protect it from swinging off-scale. Such reading is then recorded. Switch $S_1$ is thereafter opened to add resistor 50 into the circuit which—with the values shown—reduces the current flow through milliammeter 30 to approximately 2 milliamperes; this produces a potential at the junction of resistors 32, 34 of a value insufficient to maintain conduction in diodes 40, 42. The current reading of the meter 30 is also recorded. Switch $S_1$ is thereafter closed and switch $S_2$ is opened to insert resistor 52 into the circuit and to produce a 1 milliampere current flow through the meter 30 with the values shown. This reading is also recorded, after which test probes $P_1$ and $P_2$ are removed from the AC outlet.

Next, test probe $P_2$ is connected to the assumed earth ground. Test probe $P_1$ is connected to one side of the AC outlet to compare the previously obtained readings with readings similarly obtained with this arrangement. If the meter 30 indicates a 4.5 milliampere current flow with switches $S_1$ and $S_2$ closed, then further readings are taken with switch $S_1$ opened and then with switch $S_2$ opened instead. If all readings of the milliammeter 30 correspond to those taken with the connections of the test probes $P_1$ and $P_2$ to the AC outlet, then the assumed earth ground is approximately correct. If the milliammeter 30 fails to deflect when test probe $P_1$ is connected to one side of the AC outlet, the readings with the switches $S_1$ and $S_2$ closed should be taken after connecting the probe $P_1$ to the other side of the power outlet. When the readings taken with this second arrangement correspond to the readings taken with the test probes connected to both sides of the AC outlet, then the earth ground and meter have been checked for correct operation.

The testing of an electrical appliance (particularly a television receiver) can then be made in the following way. First, the test probe $P_2$ is connected to earth ground in the manner previously described. The television receiver is then connected directly to the AC power line—not through an isolation transformer—after which the test probe $P_1$ is connected sequentially to all accessible parts of the receiver, such as knobs, exposed screws, escutcheons, antenna terminals, etc. Any current flow from test probe $P_1$ to probe $P_2$ through the rectifiers 20, 22 and milliammeter 30 which exceeds 2 milliamperes of scale indication with switches $S_1$ and $S_2$ closed indicates the presence of a leakage current beyond the acceptable 2 milliampere level. This then indicates the presence of a fault which should be repaired before the appliance is returned to the customer. After such checking and necessary repair have been completed, the plug to the AC power line is reversed and the test procedure repeated. As will be readily apparent, such procedures can be carried out rather rapidly as no scale switching or polarity switching of the meter is required. Any presence of leakage current as would tend to overdrive the milliammeter 30 is regulated by the diodes 40, 42 to afford the needed protection for the meter 30. The use of two diodes 40, 42 adds a redundancy feature to the arrangement to protect the meter should one of the devices fail. This redundancy feature is provided at an acceptable cost as the diodes employed are relatively inexpensive. The milliammeter movement can similarly be an inexpensive item, as a typical unit having a 200 ohm or so series resistance may cost of the order of $2.00.

While the arrangement described is considered a preferred embodiment of the invention, it will be seen that other modifications can be had without departing from the teachings herein. Thus, it may be desirable to provide an audible or visual alert once the leakage current reaches the acceptable 2 milliamp level. Such audible alarm system can be provided by incorporating a silicon controlled rectifier 70, for example, in series connection with a battery +V and a buzzer-oscillator alarm 75 between the illustrated terminals A, B to provide such a signal indication once the voltage across resistor 34 and meter 30 reaches that predetermined voltage corresponding to the 2 milliampere current flow. The arrangement can be designed, if desired, to keep the alarm sounding until a re-set button is pushed. Such alarm will be seen to be but an auxiliary feature of the invention as "up-scale" readings will continue to be provided for either polarity of potential, with adequate protection built in for those instances of leakage current beyond the range of the meter scale selected. It will also be seen that should acceptable standards of permissible leakage current be changed in the future, the arrangement of the invention will continue to be applicable, requiring only changes in component value to provide optimum audible or visual alert indications as to leakage current excesses.

What is claimed is:

1. A leakage detector for determining possible shock hazards to humans from exposed, accessible parts of electrically operating apparatus which are not normally intended to carry electrical voltages, comprising:

a full wave rectifier circuit having an input terminal, an output terminal, a reference terminal and an intermediate terminal;

first means for directly connecting the reference terminal of said rectifier circuit to a point of ground potential;

second means for adaptively contacting the input terminal of said rectifier circuit with various ones of said exposed parts in determining the presence thereat of any such unintended voltages;

a direct current milliammeter; and a first resistor coupling one terminal of said milliammeter to the output terminal of said rectifier circuit, the intermediate terminal of which is direct current coupled to a second terminal of said milliammeter, and with said first resistor being of a resistance value approximating the body resistance of a human being;

whereby said direct current milliammeter provides an indication of the direct current which would be caused to flow through said resistor due to the presence of any unintended voltages on those exposed parts contacted by said second means, and an indication of the direct current which would pass through a human being who would come into physical contact with said energized parts unless measures were taken to correct such electrical leakages.

2. The electrical leakage detector of claim 1 wherein said rectifier circuit includes a first semiconductor rectifier having an anode connected to said input terminal and a cathode connected to said output terminal, a second semiconductor rectifier having an anode connected to said reference terminal and a cathode connected to said output terminal, a third semiconductor rectifier having an anode connected to said intermediate terminal and a cathode connected to said input temrinal and a fourth semiconductor rectifier having an anode connected to said intermediate terminal and a cathode connected to said reference terminal.

3. The electrical leakage detector of claim 2 wherein a second resistor is additionally included to serially couple said milliammeter to said first resistor and wherein a semiconductor diode is also included coupled across said second resistor and said milliammeter to become conductive and limit current flow through said milliammeter when the current through said second resistor reaches a predetermined value.

4. The electrical leakage detector of claim 2 wherein a second resistor is additionally included to serially couple said milliammeter to said first resistor and wherein a silicon controlled rectifier is also included having input and output electrodes connected to a source of energizing potential and to an alarm means, respectively, and also having a control electrode coupled across said second resistor and said milliammeter to activate said alarm means when the voltage developed across said second resistor and said milliammeter in response to the current flowing through said first resistor reaches a predetermined value.

* * * * *